United States Patent
Vanhoorne et al.

(10) Patent No.: US 7,754,084 B2
(45) Date of Patent: Jul. 13, 2010

(54) HEAT-STABLE ANION EXCHANGERS

(75) Inventors: Pierre Vanhoorne, Monheim (DE); Wolfgang Podszun, München (DE); Reinhold Klipper, Köln (DE); Michael Schelhaas, Köln (DE)

(73) Assignee: LANXESS Deutschland GmbH, Leverkusen (DE)

( * ) Notice: Subject to any disclaimer, the term of this patent is extended or adjusted under 35 U.S.C. 154(b) by 293 days.

(21) Appl. No.: 11/899,125

(22) Filed: Sep. 4, 2007

(65) Prior Publication Data
US 2008/0087604 A1   Apr. 17, 2008

(30) Foreign Application Priority Data
Sep. 27, 2006   (DE) .................... 10 2006 045 504

(51) Int. Cl.
*C08J 9/00*   (2006.01)
(52) U.S. Cl. .................. 210/660; 210/688; 521/25; 521/30; 521/32
(58) Field of Classification Search ............. 210/660, 210/688; 521/25, 30, 32
See application file for complete search history.

(56) References Cited

U.S. PATENT DOCUMENTS

| | | | | |
|---|---|---|---|---|
| 4,077,918 A | | 3/1978 | Corte et al. ............ 260/2.1 E |
| 4,427,794 A | | 1/1984 | Lange et al. ............... 521/28 |
| 4,952,608 A | | 8/1990 | Klipper et al. ............. 521/32 |
| 6,649,663 B1 | * | 11/2003 | Klipper et al. ............. 521/32 |
| 7,077,964 B2 | * | 7/2006 | Klipper et al. ............ 210/688 |

FOREIGN PATENT DOCUMENTS

| | | | |
|---|---|---|---|
| DE | 79 152 | | 1/1971 |
| EP | 670 184 A2 | | 9/1995 |
| EP | 670 184 A3 | | 9/1995 |
| EP | 670184 A2 | * | 9/1995 |
| EP | 0 444 643 | | 5/1996 |
| EP | 0 617 714 | | 7/1996 |
| EP | 1 029 847 | | 8/2000 |
| IL | 52121 | | 10/1980 |
| JP | 2003230881 | | 8/2003 |

* cited by examiner

*Primary Examiner*—Peter D. Mulcahy
*Assistant Examiner*—Henry Hu
(74) *Attorney, Agent, or Firm*—Nicanor A. Kohncke

(57) ABSTRACT

The present invention relates to heat-stable anion exchangers based on at least one aromatic monomer and at least one crosslinker having structural elements of the general formula (I)

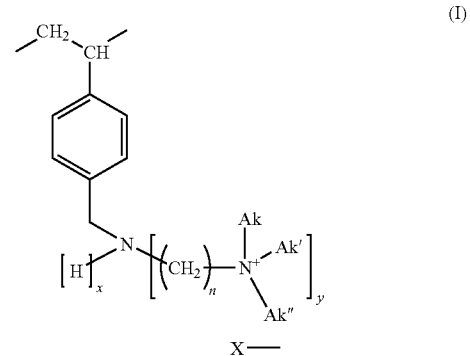

where
Ak, Ak', Ak" are in each case independently of one another identically or differently a $C_1$-$C_{18}$-alkyl radical,
n is an even number between 5 and 18,
x+y=2, where x is equal to 0 or 1, and
X is Cl, Br, OH, $HCO_3$, $HSO_4$, ½ ($SO_4$), ½ $CO_3$, $NO_3$, F, $H_2PO_4$, ½ $HPO_4$, ⅓ $PO_4$ with the result that these anion exchangers, preferably in the OH form, withstand a working temperature of at least 60° C., preferably of at least 80° C., over a relatively long time, a process for production thereof and also use thereof.

4 Claims, No Drawings

HEAT-STABLE ANION EXCHANGERS

The present invention relates to heat-stable anion exchangers based on at least one aromatic monomer and at least one crosslinker having structural elements of the general formula (I)

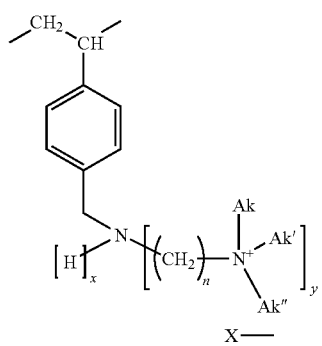

where

Ak, Ak', Ak" are in each case independently of one another identically or differently a $C_1$-$C_{18}$-alkyl radical, n is an even number between 5 and 18, x+y=2, where x is equal to 0 or 1, and X is Cl, Br, OH, $HCO_3$, $HSO_4$, ½ ($SO_4$), ½ $CO_3$, $NO_3$, F, $H_2PO_4$, ½ $HPO_4$, ⅓ $PO_4$ with the result that these anion exchangers, preferably in the OH form, withstand a working temperature of at least 60° C., preferably of at least 80° C., over a relatively long time, a process for production thereof and also uses thereof. A relatively long period in the meaning of the present invention is 1 to 12 months, preferably 1 to 10 months, particularly preferably 1 to 8 months.

BACKGROUND OF THE INVENTION

Ion exchangers are used in many sectors such as, for example for softening water, for deionizing and purifying aqueous solutions, for separation and purification of sugar and amino acid solutions and for producing high-purity water in the electronics and pharmaceuticals industries. However, the conventional anion exchangers cannot be used under extreme temperature conditions. In particular, their thermal stability leaves something to be desired. If it is wished to avoid premature breakdown of the functional groups, the maximum temperature for a long term use must not be above 60° C. Even at room temperature, with conventional resins, a certain breakdown of the resin and release of the resin constituents into the surrounding solution, what is termed bleaching, is unavoidable.

For certain applications having high working temperatures in the range above 60° C., anion exchangers are required which withstand these elevated temperatures for a relatively long time period. Such conditions occur, for example, in deionizing in the heat-exchange of various machinery and plants, such as, for example, engines and power stations (conventional and nuclear). In such applications, the anion exchangers are usually used in combination with a cation exchanger, also in mixed form in what are termed mixed beds. In order to be able to comply with the task of deionizing, the anion exchangers must be used with OH⁻ as counterion (what is termed the OH form).

EP-A 0 444 643 and JP-A 2003 230881 mention anion-exchange resins which can be used in the OH form at relatively high temperatures. The production pathway of these thermally stable resins proceeds via a complex chemistry which is associated with low yields. As a result, the availability of these resins is not assured in industrial amounts.

SUMMARY OF THE INVENTION

An object of the present invention was therefore the synthesis of bead-type anion exchangers which withstand a working temperature of at least 60° C., preferably at least 80° C., over a relatively long time, to make them available in industrial amounts.

The solution of the object and subject matter of the present invention are anion exchangers in bead form based on at least one aromatic monomer and at least one crosslinker having structural elements of the formula (I)

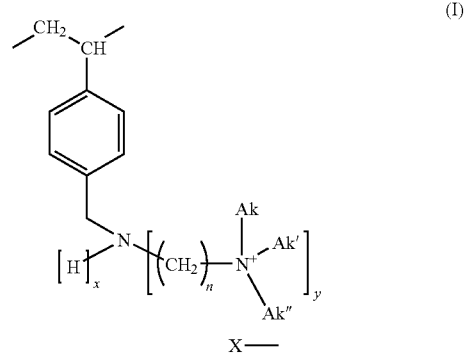

where

Ak, Ak', Ak" are in each case independently of one another identically or differently a $C_1$-$C_{18}$-alkyl radical, n is an even number between 5 and 18, x+y=2 and X is Cl, Br, OH, $HCO_3$, $HSO_4$, ½ ($SO_4$), ½ $CO_3$, $NO_3$, F, $H_2PO_4$, ½ $HPO_4$, ⅓ $PO_4$.

Surprisingly, the anion exchangers according to the invention exhibit particularly thermostable properties and are, in addition, compared with the anion exchangers known from the prior art, simple to synthesize. They are outstandingly suitable for deionizing water in cooling circuits or for use as catalyst in chemical reactions.

The anion exchangers according to the invention can be obtained either by alkylating amine-containing bead polymers or by polymerization of alkylated amine-containing monomers.

The present invention therefore also relates to a process for producing heat-stable anion exchangers based on at least one aromatic monomer and at least one crosslinker containing a structural element of the general formula (I),

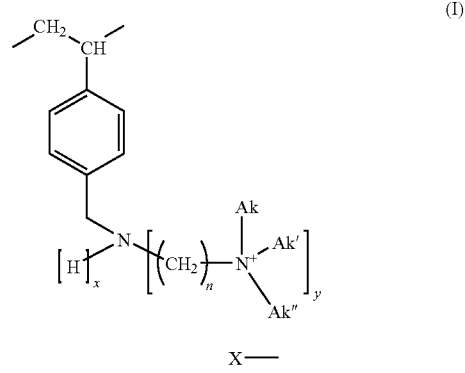

where Ak, Ak', Ak" are in each case independently of one another identically or differently a $C_1$-$C_{18}$-alkyl radical, n is an even number between 5 and 18, x+y=2 and X is Cl, Br, OH, $HCO_3$, $HSO_4$, ½ ($SO_4$), ½ $CO_3$, $NO_3$, F, $H_2PO_4$, ½ $HPO_4$, ⅓ $PO_4$, characterized in that either amine-containing bead polymers are alkylated, or alkylated amine-containing monomers are polymerized, and the ion exchangers obtained by both variants are converted to the ionic form by changing the charge.

For producing amine-containing bead polymers, preferably amine-containing monomers, particularly preferably vinylbenzylamines, alone or in combination with other non-functional monomers are (co)polymerized in bead form.

A preferred method for producing amine-containing bead polymers is first to generate non-functionalized bead polymers by suspension polymerization of non-functionalized monomers and to provide these with amine functions in one or more downstream step(s).

As non-functionalized monomers, use is made in general of monoethylenically unsaturated aromatic monomers, preferably styrene, α-methylstyrene, vinyltoluene, t-butylstyrene or vinylnaphthalene. Substances which are highly suitable are also mixtures of these monomers and also mixtures of monoethylenically unsaturated monomers having up to 20% by weight of other monoethylenically unsaturated monomers, preferably chlorostyrene, bromostyrene, acrylonitrile, methacrylonitrile, esters of acrylic acid and methacrylic acid such as methyl methacrylate, ethyl methacrylate, methyl acrylate, ethyl acrylate, isopropyl methacrylate, butyl acrylate, butyl methacrylate, hexyl methacrylate, 2-ethylhexyl acrylate, ethylhexyl methacrylate, decyl methacrylate, dodecyl methacrylate, stearyl methacrylate, or iso-bornyl methacrylate. In particular, preference is given to styrene and vinyltoluene.

Crosslinkers are added to the monomers. Crosslinkers are generally multiethylenically unsaturated compounds, preferably divinylbenzene, divinyltoluene, trivinylbenzene, ethylene glycol dimethacrylate, ethylene glycol diacrylate, ethylene glycol divinyl ether, diethylene glycol divinyl ether, butanediol divinyl ether, octadiene or triallyl cyanurate. Particular preference is given to the vinylaromatic crosslinkers divinylbenzene or trivinylbenzene. Very particular preference is given to divinylbenzene. The crosslinkers can be used alone or as a mixture of various crosslinkers. The total amount of crosslinkers to be used is generally 0.1 to 80% by weight, preferably 0.5 to 60% by weight, particularly preferably 1 to 40% by weight, based on the sum of the ethylenically unsaturated compounds.

In a preferred embodiment of the present invention, pore forming agents, which are termed porogens, can also be added to the monomers. The porogens serve for formation of a pore structure in the non-functional bead polymer. As porogens, use is preferably made of organic diluents. Particularly preferably, use is made of those organic diluents which dissolve to less than 10% by weight, preferably less than 1% by weight, in water. Porogens which are suitable in particular are toluene, ethylbenzene, xylene, cyclohexane, octane, isooctane, decane, dodecane, isododecane, methyl isobutyl ketone, ethyl acetate, butyl acetate, dibutyl phthalate, n-butanol, 4-methyl-2-pentanol and n-octanol. Very particular preference is given to toluene, cyclohexane, isooctane, isododecane, 4-methyl-2-pentanol and methyl isobutyl ketone. As porogen, however, use can also be made of non-crosslinked linear or branched polymers, such as, for example, polystyrene and poly(methyl methacrylate).

The porogen is customarily used in amounts of 10 to 70% by weight, preferably 25 to 65% by weight, in each case based on the sum of the ethylenically unsaturated compounds.

In the production of the non-functional bead polymers, the abovementioned monomers, in a further preferred embodiment of the present invention, are polymerized in aqueous suspension in the presence of a dispersion aid using an initiator.

As dispersion aid, use is preferably made of natural and synthetic water-soluble polymers. Particularly preferably, use is made of gelatin, starch, poly(vinyl alcohol), polyvinylpyrrolidone, poly(acrylic acid), poly(methacrylic acid) or copolymers of (meth)acrylic acid and (meth)acrylic esters. Very particularly preferably, use is made of gelatin or cellulose derivatives, in particular cellulose esters and cellulose ethers, such as carboxymethylcellulose, methylcellulose, hydroxyethylcellulose or methylhydroxyethylcellulose. The amount of the dispersion aid used is generally 0.05 to 1%, preferably 0.1 to 0.5%, based on the aqueous phase.

In a further preferred embodiment of the present invention, initiators are used. Suitable initiators are compounds which form free radicals on temperature increase. Preferably, use is made of peroxy compounds, particularly preferably dibenzoyl peroxide, dilauroyl peroxide, bis-(p-chlorobenzoyl)peroxide, dicyclohexyl peroxydicarbonate and tert-amyl peroxy-2-ethylhexane and also azo compounds, particularly preferably 2,2'-azobis(isobutyronitrile) or 2,2'-azobis(2-methylisobutyronitrile) or else aliphatic peroxy esters, preferably tert-butyl peroxyacetate, tert-butyl peroxyisobutyrate, tert-butyl peroxypivalate, tert-butyl peroxyoctoate, tert-butyl peroxy-2-ethylhexanoate, tert-butyl peroxyneodecanoate, tert-amyl peroxypivalate, tert-amyl peroxyoctoate, tert-amyl peroxy-2-ethylhexanoate, tert-amyl peroxyneodecanoate, 2,5-bis(2-ethylhexanoylperoxy)-2,5-dimethylhexane, 2,5-dipivaloyl-2,5-dimethylhexane, 2,5-bis(2-neodecanoylperoxy)-2,5-dimethylhexane, di-tert-butyl peroxyazelate and di-tert-amyl peroxyazelate.

The initiators are generally used in amounts of 0.05 to 6.0% by weight, preferably 0.1 to 5.0% by weight, particularly preferably 0.2 to 2% by weight, based on the sum of the ethylenically unsaturated compounds.

The aqueous phase can contain a buffer system which sets the pH of the aqueous phase to between 12 and 3, preferably between 10 and 4. Particularly highly suitable buffer systems contain phosphate, acetate, citrate or borate salts.

It can be advantageous to make use of an inhibitor dissolved in the aqueous phase. Inhibitors which come into consideration are both inorganic and organic substances. Examples of inorganic inhibitors are nitrogen compounds such as hydroxylamine, hydrazine, sodium nitrite and potassium nitrite. Examples of organic inhibitors are phenolic compounds such as hydroquinone, hydroquinone monomethyl ether, resorcinol, pyrocatechol, tert-butyl pyrocatechol, condensation products of, phenols with aldehydes. Further organic inhibitors are nitrogenous compounds such as, for example, diethylhydroxylamine and isopropylhydroxylamine. Resorcinol is preferred as inhibitor. The concentration of the inhibitor is 5-1000 ppm, preferably 10-500 ppm, particularly preferably 20-250 ppm, based on the aqueous phase.

The organic phase can be dispersed into the aqueous phase as droplets by stirring or by jetting. An organic phase is taken to mean the mixture of monomer(s) and crosslinker(s) and also if appropriate porogen(s) and/or initiator(s). In classic dispersion polymerization, the organic droplets are generated by stirring. On a 4 liter scale, typically, stirrer speeds of 250 to 400 rpm are used. If the droplets are produced by jetting, it is advisable, to obtain uniform droplet diameter, to encapsulate the organic droplets. Processes for microencapsulation of jetted organic droplets are described, for example, in EP-A 0 046 535, the contents of which with respect to microencapsulation are incorporated by reference in the present application.

The average particle size of the optionally encapsulated monomer droplets is 10-1000 µm, preferably 100-1000 µm.

The ratio of the organic phase to the aqueous phase is generally 1:20 to 1:0.6, preferably 1:10 to 1:1, particularly preferably 1:5 to 1:1.2.

However, the organic phase, in the seed-feed process can also be added to a suspension of seed polymers which take up the organic phase according to EP-A 0 617 714, the teaching of which is incorporated by reference in the present application. The mean particle size of the seed polymers swollen by the organic phase is 5-1200 µm, preferably 20-1000 µm. The ratio of the sum of organic phase+seed polymer to aqueous phase is generally 1:20 to 1:0.6, preferably 1:10 and 1:1, particularly preferably 1:5 to 1:1.2.

The monomers are polymerized at elevated temperature. The polymerization temperature depends on the decomposition temperature of the initiator and is typically in the range from 50 to 150° C., preferably 60 to 120° C. The polymerization time is 30 minutes to 24 hours, preferably 2 to 15 hours.

At the end of polymerization, the non-functional bead polymers are separated off from the aqueous phase, for example on a vacuum filter, and, if appropriate dried.

By jetting or by seed-feed processes, the monodisperse heat-stable anion exchangers preferred according to the invention are obtained. In the present application, substances are described as monodisperse in which at least 90% by volume or by mass of the particles have a diameter which is in the range of the most frequent diameter within an interval of width of ±10% of the most frequent diameter.

For example, in the case of a substance having the most frequent diameter of 0.5 mm, at least 90% by volume or by mass are within a size interval between 0.45 mm and 0.55 mm, and in the case of a substance having the most frequent diameter of 0.7 mm, at least 90% by volume or by mass are within a size interval between 0.77 mm and 0.63 mm.

Functionalization to give amine-containing bead polymers can proceed by various processes. For instance, the bead polymers can be reacted to give amine-containing bead polymers by chloromethylation and subsequent reaction with, for example, hexamethylenetetramine according to DD 79152 and IL 52121.

A preferred process for reacting non-functional polyvinylaromatic bead polymers to give amine-containing bead polymers is what is termed the phthalimide process according to U.S. Pat. No. 4,952,608, DAS 2519244 and EP-A 1 078 690, the teaching of which with respect to the phthalimide process is hereby incorporated by reference in the present application. In this case the non-functionalized polyvinylaromatic bead polymers are condensed with phthalimide derivatives. As catalyst, use is made of oleum, sulphuric acid or sulphur tri oxide.

Elimination of the phthalic acid radical and thus liberation of the aminomethyl group is performed by treating the phthalimidomethylated crosslinked bead polymer with aqueous or alcoholic solutions of an alkali metal hydroxide such as sodium hydroxide or potassium hydroxide at temperatures between 100 and 250° C., preferably 120 to 190° C. The concentration of the sodium hydroxide solution is in the range from 10 to 50% by weight, preferably 20 to 40% by weight. This process enables the production of aminoalkyl-containing crosslinked bead polymers having a substitution of the aromatic nuclei greater than 1.

The resultant aminomethylated bead polymer is finally washed alkali free using deionized water.

Alkylation of the amine-containing monomers and/or polymers proceeds, for example, by reaction with ω-functional alkylammonium salts of the general formula (II)

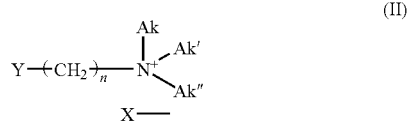

where
n is an integer between 5 and 18,
Y is Br, Cl, I or $(SO_4)_{1/2}$,
$X^-$ is a suitable counterion such as, for example, $Cl^-$, $Br^-$, $I^-$, $(SO_4^{2-})_{1/2}$, $NO_3^-$, $HCO_3^-$ and
Ak, Ak', Ak" are, in each case independently of one another, identically or differently a linear or branched alkyl group having 1 to 18 carbon atoms, with or without functional groups.

Preferably, n is an integer from 5 to 11, Y is Br and/or Cl, $X^-$ is $Br^-$ and/or $Cl^-$ and Ak, Ak', Ak" are, in each case independently of one another, methyl, ethyl, 2-hydroxyethyl, n-propyl, 2-hydroxypropyl or n-butyl. In particular preferably, the alkylation proceeds by means of 5-bromopentyltrimethylammonium bromide, 6-bromohexyltrimethylammonium bromide, 5-chloropentyltrimethylammonium chloride or 6-chlorohexyltrimethylammonium chloride.

The ω-functional alkylammonium salts can be used alone or else as a mixture of various ω-functional alkylammonium salts.

The aminofunctional bead polymer is reacted with the ω-functional alkylammonium salts in a solvent which not only swells the aminofunctional bead polymer but also dissolves the ω-functional alkylammonium salts. Such solvents are, for example, water, methanol, ethanol, isopropanol, dimethyl sulphoxide, dimethylformamide and acetonitrile. Preference is given to water and methanol, particular preference to water.

The reaction of the aminofunctional bead polymer with the ω-functional alkylammonium salts generally proceeds at temperatures between 20° C. and 100° C., preferably between 30° C. and 80° C., particularly preferably between 30° C. and 70° C. The reaction time is generally 0.5 to 48 h, preferably 1 to 36 h, particularly preferably 1 to 24 h. It is advantageous to carry out the reaction at a constant pH between pH 7 and pH 11, preferably between pH 8 and pH 10.

The molar ratio of ω-functional alkylammonium salts to amino groups in the aminofunctional bead polymer is generally 0.1 to 5, preferably 0.5 to 4, particularly preferably 1 to 3.

After the end of the reaction, the resins are generally isolated and washed with solvent, preferably water, in order to extract the unreacted ω-functional alkylammonium salts.

The resins can be brought into the desired ionic form by changing their charge using various alkali metal hydroxide solutions, acids and salts. For instance, by treatment with sulphuric acid, what is termed the sulphate form is generated, where the anion exchanger predominantly bears sulphate ions as counterions; by treatment with sodium hydroxide solution the hydroxide form is generated, where the anion exchanger predominantly bears hydroxide ions as counterions; by treatment with sodium chloride solution the chloride form is generated, where the anion exchanger predominantly bears chloride ions as counterions, etc. For the synthesis of thermostable anion exchangers, changing the charge to the OH form is preferred.

In applications for demineralization, and in particular what are termed mixed beds (polishers), resins are required which bear up to 95% hydroxide ions as counterions.

Such resins can be generated by a particular sequential changing of charge using various solutions. For instance, treatment, for example, using 1 to 10 bed volumes of dilute sulphuric acid (1 to 15% by weight) followed by 1 to 20 bed volumes of sodium hydroxide solution (2 to 15% by weight) has been proved to be particularly efficient. Preference is given to 5 bed volumes of 10% strength by weight sulphuric acid followed by 4 bed volumes of 10% strength by weight sodium hydroxide solution. A bed volume is taken to mean the volume which the resin packing takes up in water after vibrating to constant volume.

The strongly basic anion exchangers obtained according to the invention are distinguished by high exchange capacity, good osmotic and mechanical stability and by excellent thermal stability, for which reason they are outstandingly suitable and can be used for deionizing water in cooling circuits or for use as catalyst in chemical reactions. The strongly basic anion exchangers obtained according to the invention are very particularly suitable in the treatment of radioactively contaminated cooling circuits of primary and/or secondary circuit systems in nuclear reactors. In addition, their use in fuel cooling installations of nuclear power stations can lead to prolonged working cycles owing to the thermal stability.

The strongly basic anion exchangers obtained according to the invention are, in particular, able to obtain 80% of their original strongly basic exchange capacity in the hydroxide form (at least 90% hydroxide counterions) after 3600 h at 80° C. in deionized water, and also to obtain 50% of their original strongly basic exchange capacity after 3600 h at 100° C. in deionized water.

In a rapid test they are able to obtain 95% of their original strongly basic exchange capacity in the hydroxide form after 60 h at 100° C. in 0.1 mol/l sodium hydroxide solution.

The invention will be described hereinafter by examples. These examples are in no way a restriction of the invention described here.

EXAMPLES

Example 1

Production of a Heterodisperse Amine-Containing Bead Polymer

1a) Production of a Heterodisperse Bead Polymer

At room temperature, 1112 ml of deionized water, 150 ml of a 2% strength by weight aqueous solution of methylhydroxyethylcellulose and also 7.5 gram of disodium hydrogenphosphate.12$H_2O$ were charged into a polymerization reactor. The total solution was stirred for one hour at room temperature. Subsequently, a monomer mixture comprising 95.37 g of divinylbenzene 80.53% strength by weight, 864.63 g of styrene, 576 g of isododecane and 7.70 g of dibenzoyl peroxide 75% strength by weight was subsequently added. The batch first remained for 20 minutes at room temperature and was then stirred for 30 minutes at room temperature at a stirrer speed of 200 rpm. The batch was heated to 70° C., stirred for a further 7 hours at 70° C., then heated to 95° C. and stirred for a further 2 hours at 95° C. After cooling, the resultant bead polymer was filtered off, washed with water and dried at 80° C. for 48 hours.

1b) Production of a Heterodisperse Amidomethylated Bead Polymer

At room temperature, 2000 g of 1,2-dichloroethane, 608 g of phthalimide and 423 g of 30.0% strength by weight formalin were charged. The pH of the suspension was adjusted to 5.5 to 6 using sodium hydroxide solution. Subsequently the water was removed by distillation. Then, 44.6 g of sulphuric acid were added. The resultant water was removed by distillation. The batch was cooled. At 30° C., 163 g of 65% strength by weight oleum were added, subsequently 320 g of heterodisperse bead polymer from example 1a). The suspension was heated to 70° C. and stirred for a further 6 hours at this temperature. The reaction broth was taken off, deionized water was added and residual amounts of dichloroethane were removed by distillation.

Yield of amidomethylated bead polymer: 1710 ml
Composition by elemental analysis: Carbon: 75.1% by weight; hydrogen: 4.9% by weight; nitrogen: 5.9% by weight 1c) Production of a Heterodisperse, Aminomethylated Bead Polymer 920 ml of 20% strength by weight sodium hydroxide solution were added at room temperature to 1000 ml of amidomethylated bead polymer from example 1b). The suspension was heated to 180° C. and stirred for 8 hours at this temperature.

The resultant bead polymer was washed with deionized water.

Yield of aminomethylated bead polymer: 840 ml
Composition by elemental analysis: nitrogen: 11.5% by weight
Aminomethyl group content of the resin: 2.49 mol/l Example 2

Production of a Monodisperse Amine-Containing Bead Polymer

2a) Production of a Monodisperse, Macroporous Bead Polymer Based on Styrene, Divinylbenzene and Ethylstyrene 3000 g of deionized water were charged into a 10 l glass reactor and a solution of 10 g of gelatin, 16 g of disodium hydrogenphosphate dodecahydrate and 0.73 g of resorcinol in 320 g of deionized water were added and mixed. The mixture was heated to 25° C. With stirring, subsequently a mixture of 3200 g of microencapsulated monomer droplets having a narrow particle size distribution of 3.6% by weight divinylbenzene and 0.9% by weight ethylstyrene (used as commercially conventional mixture of isomers of divinylbenzene and ethylstyrene having 80% divinylbenzene), 0.5% by weight dibenzoyl peroxide, 56.2% by weight of styrene and 38.8% by weight of isododecane (technical mixture of isomers having a high fraction of pentamethylheptane) obtained by jetting was added, with the microcapsules consisting of a formaldehyde-cured complex coacervate of gelatin and a copolymer of acrylamide and acrylic acid, and 3200 g of aqueous phase having a pH of 12 being added. The average particle size of the monomer droplets was 460 µm.

The batch was polymerized to completion with stirring by temperature elevation according to a temperature programme starting at 25° C. and ending at 95° C. The batch was cooled, washed over a 32 µm sieve and subsequently dried in vacuum at 80° C. This produces 1893 g of a bead-type polymer having an average particle size of 440 µm, narrow particle size distribution and smooth surface.

The polymer was chalky white in appearance and had a bulk density of approximately 370 g/l.

2b) Production of a Monodisperse, Amidomethylated Bead Polymer 2373 g of dichloroethane, 705 g of phthalimide and 505 g of 29.2% strength by weight formalin were charged at room temperature. The pH of the suspension was adjusted to 5.5 to 6 using sodium hydroxide solution. Subsequently the water was removed by distillation. Then, 51.7 g of sulphuric acid were added. The resultant water was removed by distillation. The batch was cooled. At 30° C., 189 g of 65% strength by weight oleum and subsequently 371.4 g of monodisperse bead polymer from example 2a) were added. The suspension was heated to 70° C. and stirred for a further 6 hours at this temperature. The reaction broth was taken off, deionized water was added and residual amounts; of dichloroethane are removed by distillation.

Yield of amidomethylated bead polymer: 2140 ml
Composition by elemental analysis:

| Carbon: | 75.3% by weight; |
|---|---|
| Hydrogen: | 4.9% by weight; |
| Nitrogen: | 5.8% by weight; |
| Remainder: | Oxygen. |

2c) Production of a Monodisperse, Aminomethylated Bead Polymer 1019 g of 45% strength by weight sodium hydroxide solution and 406 ml of deionized water were added at room temperature to 2100 ml of amidomethylated bead polymer from 2b). The suspension was heated to 180° C. and stirred for 6 hours at this temperature.

The resultant bead polymer was washed with deionized water.

Yield of aminomethylated bead polymer: 1770 ml
This gives a total yield, estimated, of 1804 ml
Composition by elemental analysis: Nitrogen: 10.90% by weight Amount of aminomethyl groups in mole per litre of aminomethylated bead polymer: 2.29.

From the composition of the aminomethylated bead polymer by elemental analysis, it may be calculated that on a statistical average, per aromatic nucleus, originating from the styrene and divinylbenzene units, 1.06 hydrogen atoms were substituted by aminomethyl groups.

Example 3

Production of a Thermostable Anion Exchanger Using 6-bromohexyltrimethylammonium Bromide According to the Invention 250 ml of the resin from example 1c) were charged in 750 ml of water. At room temperature, a solution of 565 g of 6-bromohexyltrimethylammonium bromide in 500 ml of water was added.

The suspension was heated to 50° C. and kept at this temperature for 24 h, with the pH being maintained at pH 9 by adding 10% strength by weight sodium hydroxide solution.

After 24 h, 320 ml of 10% strength by weight sodium hydroxide solution were consumed.

The resin was washed with deionized water until the effluent is bromide-free (bromide ions detected by precipitation with silver nitrate).

This produced 600 ml of an anion exchanger in the bromide form containing 5.7% by weight nitrogen.

For conversion to the hydroxide form, the resin was treated in a column as follows:

In the course of 2 h, 2150 ml of 5.3% strength by weight sodium hydroxide solution were passed through the resin at 70° C.

The resin was then washed to neutrality using deionized water at 70° C.

In the course of 2 h, 4300 ml of 7% strength by weight sulphuric acid were passed through the resin. Subsequently the resin was washed to neutrality. This is followed by a treatment with 4200 ml of 5% strength by weight sodium hydrogencarbonate solution in 2 h and a neutral washing. Subsequently, the resin was eluted with 2150 ml of 5.3% strength by weight sodium hydroxide solution in the course of 4 h and washed with deionized water until the effluent has a conductivity <4 µS/cm.

Yield of resin in the hydroxide form: 630 ml.
Amount of weakly basic groups in mole per litre of resin in the hydroxide form: 0.85.
Amount of strongly basic groups in mole per litre of resin in the hydroxide form: 0.91.

Example 4

Production of a Thermostable Anion Exchanger Using 6-bromohexyltrimethylammonium Bromide According to the Invention 250 ml of the resin from example 2c) were placed into 750 ml of water. At room temperature, a solution of 520 g of 6-bromohexyltrimethylammonium bromide in 500 ml of water was added.

The suspension was heated to 50° C. and kept at this temperature for 24 h, with the pH being kept at pH 9 by adding 10% strength by weight sodium hydroxide solution.

After 24 h, 500 ml of 10% strength by weight sodium hydroxide solution were consumed.

The resin was washed with deionized water until the effluent is bromide-free (detection of bromide ions by precipitation with silver nitrate).

This produced 575 ml of an anion exchanger in the bromide form containing 7.3% by weight nitrogen.

For conversion to the hydroxide form, the resin was treated in a column as follows:

In the course of 2 h, 2050 ml of 5.3% strength by weight sodium hydroxide solution were passed through the resin at 70° C.

The resin was then washed to neutrality with deionized water at 70° C.

In the course of 2 h, 4150 ml of 7% strength by weight sulphuric acid were passed through the resin. Subsequently the resin was washed to neutrality. There followed a treatment with 4000 ml of 5%, strength by weight sodium hydrogencarbonate solution in 2 h and a washing to neutrality. Subsequently, the resin was eluted with 2050 ml of 5.3% strength by weight sodium hydroxide solution in the course of 4 h and washed with deionized water until the effluent has a conductivity <4 µS/cm.

Yield of resin in the hydroxide form: 590 ml.
Amount of weakly basic groups in mole per litre of resin in the hydroxide form: 0.73.
Amount of strongly basic groups in mole per litre of resin in the hydroxide form: 0.82.

Example 5

Production of a Thermostable Anion Exchanger Using 5-bromopentyltrimethylammonium Bromide According to the Invention 250 ml of a resin having 2.3 mole of aminomethyl groups per litre, produced in a similar manner to example 2a-c) were placed in 750 ml of water. At room temperature, a solution of 350 g of 5-bromopentyltrimethylammonium bromide in 500 ml of water was added.

The suspension was heated to 50° C. and kept at this temperature for 24 h, with the pH being maintained at pH 9 by adding 10% strength by weight sodium hydroxide solution.

After 24 h, 350 ml of 10% strength by weight sodium hydroxide solution were consumed.

The resin was washed with deionized water until the effluent is bromide free (detection of bromide ions by precipitation with silver nitrate).

This produced 600 ml of an anion exchanger in the bromide form containing 7.7% by weight nitrogen.

For conversion to the hydroxide form, the resin was treated in a column as follows:

In the course of 2 h, 2150 ml of 5.3% strength by weight sodium hydroxide solution were passed through the resin at 70° C.

The resin was then washed to neutrality with deionized water at 70° C.

In the course of 2 h, 4300 ml of 7% strength by weight sulphuric acid were passed through the resin. Subsequently the resin was washed to neutrality. There followed treatment with 4200 ml of 5% strength by weight sodium hydrogencarbonate solution in 2 h and a washing to neutrality. Subsequently, the resin was eluted with 2150 ml of 5.3% strength by weight sodium hydroxide solution in the course of 4 h and washed with deionized water until the effluent had a conductivity <4 µS/cm.

Yield of resin in the hydroxide form: 690 ml.

Amount of weakly basic groups in mole per litre of resin in the hydroxide form: 0.81.

Amount of strongly basic groups in mole per litre of resin in the hydroxide form: 0.85.

Example 6

Production of an Anion Exchanger Using 4-bromobutyltrimethylammonium Bromide

Not According to the Invention 250 ml of a resin having 2.3 mol of aminomethyl groups per litre, produced in a similar manner to example 2a-c were placed into 750 ml of water. At room temperature, a solution of 160 g of 4-bromobutyltrimethylammonium bromide in 500 ml of water was added.

The resin was washed with deionized water until the effluent is bromide free (detection of bromide ions performed by precipitation with silver nitrate).

This produced 480 ml of an anion exchanger in the bromide form containing 7.6% by weight of nitrogen.

To convert it to the hydroxide form, the resin was treated in a column in the course of 2 h with 1200 ml of 4% strength by weight sodium hydroxide solution.

Subsequently, the resin was washed with deionized water until the effluent was neutral.

Amount of weakly basic groups in mole per litre of resin in the hydroxide form: 1.01.

Amount of strongly basic groups in mole per litre of resin in the hydroxide form: 0.55.

Example 7

Production of an Anion Exchanger Using Glycidyltrimethylammonium Chloride

Not According to the Invention 250 ml of a resin having 2.3 mol of aminomethyl groups per litre, produced in a similar manner to example 2a-c) were eluted in a column with 1500 ml of methanol and subsequently placed in 2200 ml of methanol. At room temperature, 131 g of glycidyltrimethylammonium chloride were added. The suspension was kept under reflux for 12 h.

After ending the reaction, the resin was first washed in a column with 1500 ml of methanol, then with deionized water until the effluent is chloride free (detection of chloride ions performed by precipitation with silver nitrate).

This produced 520 ml of an anion exchanger in the chloride form containing 9.9% by weight nitrogen.

For conversion to the hydroxide form, the resin was treated in a column as follows:

In the course of 2 h, 1850 ml of 5.3% strength by weight sodium hydroxide solution were passed through the resin at 70° C.

The resin was then washed to neutrality using deionized water at 70° C.

In the course of 2 h, 3700 ml of 7% strength by weight sulphuric acid were passed through the resin. Subsequently, the resin was washed to neutrality. There followed treatment with 3650 ml of 5% strength by weight sodium hydrogencarbonate solution in 2 h and a washing to neutrality. Subsequently, the resin was eluted with 1850 ml of 5.3% strength by weight sodium hydroxide solution in the course of 4 h, and washed with deionized water until the effluent had a conductivity <4 µS/cm.

Yield of resin in the hydroxide form: 560 ml.

Amount of weakly basic groups in mole per litre of resin in the hydroxide form: 0.98.

Amount of strongly basic groups in mole per litre of resin in the hydroxide form: 0.56.

Example 8

Production of an Anion Exchanger Using 6-bromohexyltrimethylammonium Bromide

Not According to the Invention

Stage 1)

1000 ml of the resin from example 2c and 497 g of 30% strength by weight formaldehyde solution were placed in 1000 ml of deionized water. The suspension was heated to 40° C. and the pH adjusted to pH 3 by means of 85% strength by weight formic acid. Subsequently, the following temperature programme was employed: hold at 55° C. for 30 minutes, hold at 70° C. for 30 minutes, hold at 85° C. for 30 minutes and finally brought to reflux. In the course of this the pH was further held at pH 3 by adding 85% strength by weight formic acid. 30 minutes after reaching reflux temperature, the pH was adjusted to pH 2. For pH adjustment, 85% strength by weight formic acid was used until 269 g of 85% strength by weight formic acid were consumed. Subsequently, the pH was adjusted using 50% strength by weight sulphuric acid. After 30 minutes of reflux at pH 2, the pH was adjusted to 1. Reflux at pH 1 was maintained for a further 10 hours.

After the suspension was cooled, the resin was washed with deionized water and is subsequently eluted in a column first with 3000 ml of 4% strength by weight sodium hydroxide solution, thereafter with deionized water, until the effluent was neutral.

This produced 1150 ml of a dimethylaminomethyl group-containing resin.

Amount of dimethylaminomethyl groups in mole per litre of bead polymer: 1.78

Stage 2)

250 ml of the resin from stage 1 were placed in 750 ml of water. At room temperature, a solution of 202 g of 6-bromohexyltrimethylammonium bromide in 500 ml of water was added.

The suspension was heated to 50° C. and kept at this temperature for 24 h, with the pH being kept at pH 9 by adding 10% strength by weight sodium hydroxide solution.

After 24 h, 200 ml of 10% strength by weight sodium hydroxide solution were consumed.

The resin was washed with deionized water until the effluent was bromide free (detection of bromide ions performed by precipitation with silver nitrate).

This produced 420 ml of an anion exchanger in the bromide form containing 7.2% by weight nitrogen.

For conversion to the hydroxide form, the resin was treated in a column as follows:

In the course of 2 h, 1500 ml of 5.3% strength by weight sodium hydroxide solution were passed through the resin at 70° C.

The resin was then washed to neutrality with deionized water at 70° C.

In the course of 2 h, 3000 ml of 7% strength by weight sulphuric acid were passed through the resin. Subsequently, the resin was washed to neutrality. There followed treatment with 2900 ml of 5% strength by weight sodium hydrogencarbonate solution in the course of 2 h and washing to neutrality. Subsequently, the resin was eluted with 1500 ml of 5.3% strength by weight sodium hydroxide solution and washed with deionized water until the effluent had a conductivity <4 µS/cm.

Yield of resin in the hydroxide form: 480 ml.

Amount of weakly basic groups in mole per litre of resin in the hydroxide form: 0.56.

Amount of strongly basic groups in mole per litre of resin in the hydroxide form: 0.73.

Example 9

Conventional Anion Exchanger

Not According to the Invention

As a comparative example, Lewatit® Monoplus MP500 was taken as conventional anion exchanger having benzyltrimethylammonium groups.

Amount of weakly basic groups in mole per litre of resin in the hydroxide form: 0.02.

Amount of strongly basic groups in mole per litre of resin in the hydroxide form: 0.91.

Example 10

Testing of Thermal Stability

Rapid Test

For estimation of the behaviour of a resin after 3600 h at 80° C. in deionized water, the thermal stability of the anion exchange resin was tested in the following rapid test:

In each case 100 ml of resin is charged into 400 ml of 0.1 mol/l of sodium hydroxide solution and stirred for 60 h at 100° C. After the resin had cooled the volume was determined and the amount of weakly basic and strongly basic groups per litre of resin was determined.

The product (resin volume)×(amount of strongly basic groups per litre of resin) gave the amount of strongly basic groups present in the tested sample.

By comparing the amount of strongly basic groups before and after thermal treatment, the percentage breakdown of strongly basic groups during thermal treatment was calculated.

The results are summarized in table 1:

TABLE 1

| | Thermal testing of the resins from examples 4 to 9. | | | | | | | | |
|---|---|---|---|---|---|---|---|---|---|
| | Before thermal testing | | | | After thermal testing | | | | |
| | Strongly basic (eq/l) | Weakly basic (eq/l) | Base amount (mmol) | | Strongly basic (eq/l) | Weakly basic (eq/l) | Vol. (ml) | Base amount (mmol) | | Breakdown strongly basic (%) |
| | | | strongly basic | weakly basic | | | | strongly basic | weakly basic | |
| Example 4 | 0.82 | 0.73 | 82 | 73 | 0.79 | 0.67 | 102 | 81 | 68 | 1 |
| Example 5 | 0.85 | 0.81 | 85 | 81 | 0.85 | 0.74 | 100 | 85 | 74 | 0 |
| Example 6 | 0.55 | 1.01 | 55 | 101 | 0.15 | 0.16 | 80 | 12 | 13 | 78 |
| Example 7 | 0.56 | 0.98 | 56 | 98 | 0.48 | 1.00 | 84 | 40 | 84 | 29 |
| Example 8 | 0.73 | 0.56 | 73 | 56 | 0.56 | 0.75 | 82 | 46 | 62 | 37 |
| Example 9 | 0.91 | 0.02 | 91 | 2 | 0.67 | 0.21 | 95 | 64 | 20 | 30 |

It may be seen that the resins of the invention (examples 4 and 5) exhibit no significant breakdown of the strongly basic groups during the thermal treatment. In contrast, in the commercially available resin, about one third of the strongly basic groups decompose (example 9).

Resins which have fewer than 5 carbon atoms between benzylamino group and quaternary ammonium group likewise show a significant breakdown of the strongly basic groups (example 6, four carbon atoms, and example 7, three carbon atoms).

Example 8 clearly shows that thermostable anion exchangers are only obtained when the benzylamino group is not quaternized.

Structure of the resin from example 8:

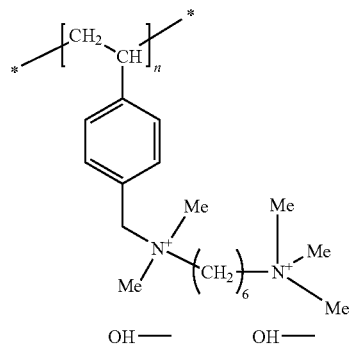

Example 11

Testing of Thermal Stability

Long-Term Test

In each case 100 ml of the resins from example 4 and example 9 were placed in 150 ml of deionized water and heated at 80° C. for 3600 h. After completion of the test, resin volume and amounts of weakly basic and strongly basic groups per litre of resin were determined.

The following results were obtained:

TABLE 2

Thermal testing of the resins from examples 4 to 9 (long-term test).

| | Before thermal testing | | | | After thermal testing | | | | | Breakdown | Preserved |
| | Strongly | | Base amount (mmol) | | Strongly | | | Base amount (mmol) | | | |
| Example | basic (eq/l) | Weakly basic (eq/l) | strongly basic | weakly basic | basic (eq/l) | Weakly basic (eq/l) | Vol. (ml) | strongly basic | weakly basic | strongly basic (%) | strongly basic (%) |
|---|---|---|---|---|---|---|---|---|---|---|---|
| 4 | 0.82 | 0.73 | 82 | 73 | 0.75 | 0.64 | 91 | 68 | 58 | 17 | 83 |
| 9 | 0.91 | 0.02 | 91 | 2 | 0.55 | 0.09 | 92 | 51 | 8 | 44 | 56 |

It may be seen that after 3600 h at 80° C. in the OH form in the resin according to the invention (example 4), more than 80% of the strongly basic groups are preserved. In the commercial resin not according to the invention (example 9), in contrast, after the test less than 60% of the strongly basic groups are preserved.

What is claimed is:

1. A strongly basic anion exchanger comprising structural elements of the general formula (I)

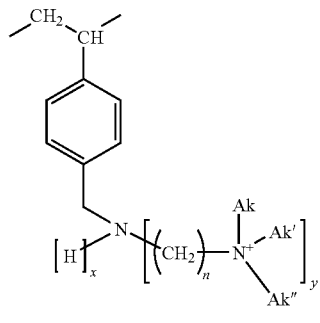

(I)

where

Ak, Ak', Ak'' are in each case independently of one another identically or differently a $C_1$-$C_{18}$-alkyl radical, n is an even number between 5 and 18, x+y is equal to 2 where x is equal to 0 or 1, and X is Cl, Br, OH, $HCO_3$, $HSO_4$, ½ ($SO_4$), ½ $CO_3$, $NO_3$, F, $H_2PO_4$, ½ $HPO_4$, ⅓ $PO_4$.

2. The strongly basic anion exchanger according to claim 1, wherein said anion exchanger is monodisperse.

3. The strongly basic anion exchanger according to claim 2, wherein a monodisperse bead polymer is a precursor to the strongly basic anion exchanger and wherein said monodisperse bead polymer is obtained by seed/feed or by jetting.

4. The strongly basic anion exchanger according to claim 1, wherein said strongly basic anion exchanger is macroporous.

* * * * *